United States Patent [19]
Depree

[11] 3,882,018
[45] *May 6, 1975

[54] PROCESS FOR RECOVERY OF MINERALS FROM ACIDIC STREAMS

[75] Inventor: David O. Depree, Loomis, Calif.

[73] Assignee: Aerojet-General Corporation, El Monte, Calif.

[*] Notice: The portion of the term of this patent subsequent to Apr. 3, 1990, has been disclaimed.

[22] Filed: Jan. 15, 1973

[21] Appl. No.: 323,500

Related U.S. Application Data

[63] Continuation-in-part of Ser. No. 95,252, Dec. 4, 1970, Pat. No. 3,725,259.

[52] U.S. Cl. .................. 210/20; 210/32; 210/38
[51] Int. Cl. .................. B01d 15/06; C02b 1/76
[58] Field of Search ........... 75/101 BE; 210/24, 28, 210/30, 31 R, 32, 33, 38, 20

[56] References Cited
UNITED STATES PATENTS

| | | | |
|---|---|---|---|
| 2,628,165 | 2/1953 | Bliss | 210/28 X |
| 2,749,306 | 6/1956 | Coleman | 210/32 |
| 2,954,276 | 9/1960 | Hazen | 210/28 X |
| 3,211,521 | 10/1965 | George et al. | 75/101 BE |
| 3,305,306 | 2/1967 | Morawe et al. | 210/30 X |
| 3,388,058 | 6/1968 | Wirth | 210/32 |
| 3,663,163 | 5/1972 | DePree et al. | 210/31 X |
| 3,725,259 | 4/1973 | DePree | 210/30 |

FOREIGN PATENTS OR APPLICATIONS
1,206,038  9/1970  United Kingdom .................. 210/28

OTHER PUBLICATIONS
Stary et al., "Systematic Study of the Solvent Extraction of Metal B–Diketonates," Anal. Chim. Acta.:28(1963), pp. 227–235.

*Primary Examiner*—Thomas G. Wyse
*Attorney, Agent, or Firm*—E. O. Ansell

[57] ABSTRACT

This patent describes a method for the removal of the soluble group Ib, IIb, III, IV, V, VI, VII and VIII water soluble metallic ions from acidic streams such as acid mine drainage, pickling waste, electroplating waste wherein the waste stream contains these metal salts as pollutants which comprises: contacting said stream with a cation exchange bed containing a strong, moderately strong of weakly acidic cation exchange resin in its alkali or alkaline earth substituted form to deposit metal ions from said salts thereon, regenerating said cation exchange resin with a solution of an alkali or alkaline earth chelate and precipitating the metals by treatment with an alkali or alkaline earth base.

21 Claims, 1 Drawing Figure

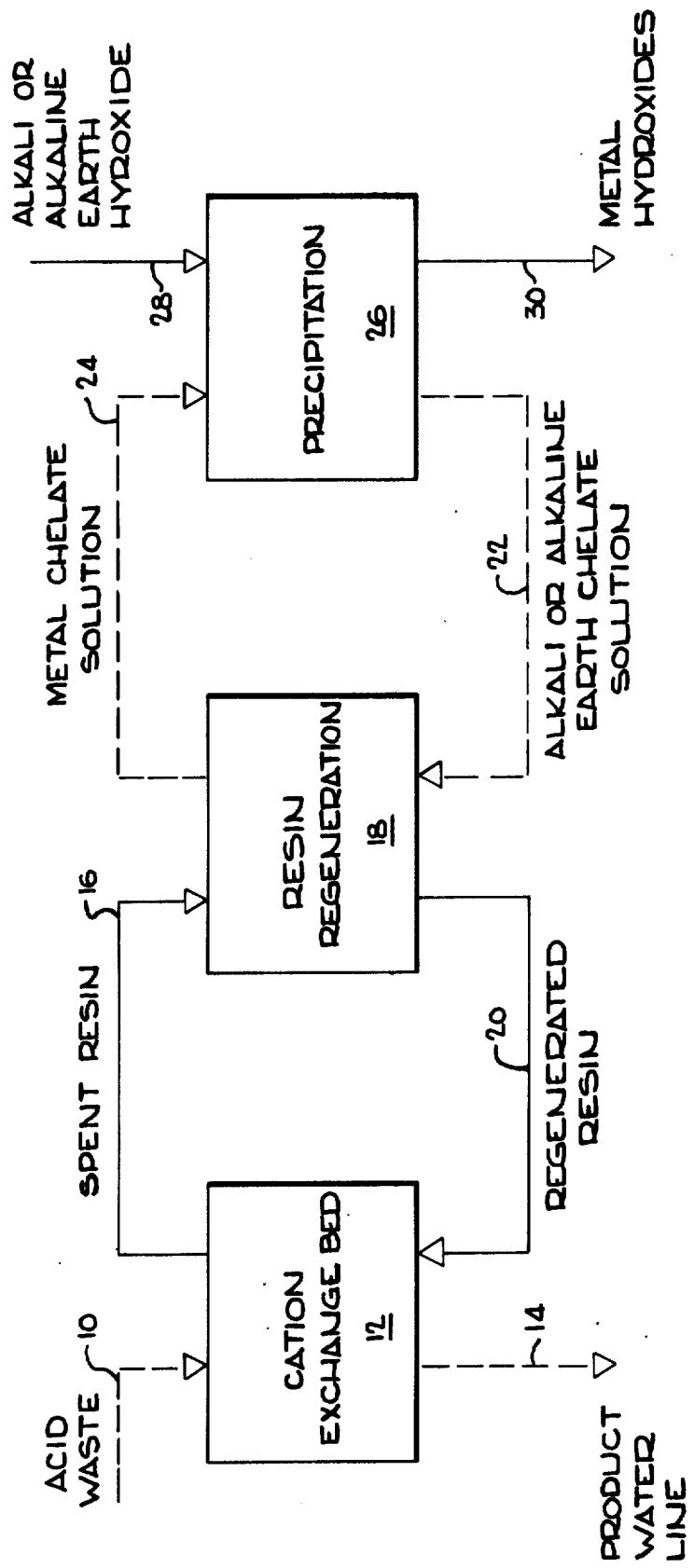

PROCESS FOR RECOVERY OF MINERALS FROM ACIDIC STREAMS

This application is a continuation-in-part of copending application Ser. No. 95,252, filed Dec. 4, 1970, now U.S. Pat. No. 3,725,259.

BACKGROUND OF THE INVENTION

It is widely recognized that modern industrial procedures have a substantial and undesirable effect on the ecology. One such source of damage to the ecology occurs in the form of waste streams from mines, pickling plants and electroplating baths. All such streams contain substantial amounts of heavy metal salts and are strongly acidic. The acidity results from hydrolyses of these salts which are salts of a weak base and strong acid. The metal salts (and acidic nature of these wastes) cause serious pollution problems if streams carrying these pollutants are discharged into streams, lakes and rivers. The present invention is believed to make a substantial contribution to the improvement of the ecology and to the specific problems associated with the disposal of certain types of industrial waste. In addition, the present invention provides a method for winning valuable metal ions from these wastes. Accordingly, it may be anticipated that the present invention will find wide application in a wide variety of industrial applications.

SUMMARY OF THE INVENTION

Briefly, the present invention comprises a method for the removal of water soluble Group Ib, IIb, III, IV, V, VI, VII and VIII water soluble metallic ions, hereinafter referred to as heavy metal, from acidic waste streams such as acid mine drainage, pickling waste, and electroplating waste wherein the waste stream is highly acidic and contains these metal salts as pollutants which comprises: contacting said stream with a cation exchange bed containing a cation exchange resin in alkali or alkaline earth substituted form to deposit metal ions from said streams thereon, self-neutralizing the acidic effluent from the cation exchange resin, and regenerating said cation ion exchange resin with a solution of an alkali or alkaline earth chelate and precipitating the metal from said solution by treatment with an alkali or alkaline earth metal hydroxide. The alkali or alkaline earth chelate is thus recovered for recycle.

The most commonly occurring metals in acid waste streams are iron, aluminum, copper, zinc, nickel, chromium, cobalt and manganese salts, and it is the removal of these cations which is the prime objective of this invention. These can be removed when they are in any of their valence states provided that they constitute a cation, i.e., non-complexed.

It is an object of the present invention to provide a novel method for the treatment of acidic wastes.

More specifically it is an object of the present invention to provide a novel method for the removal of Groups Ib, IIb, III, IV, V, VI, VII and VIII water soluble metal ions from acidic waste streams. The metal ions of these groups will be called heavy metals in this specification to differentiate them from the metals of Groups Ia and IIa (alkali and alkaline earth).

It is a further object of the present invention to overcome the ecological problems associated with acid mine drainage, pickling waste, electroplating waste, and related industrial waste streams.

These and other objects and advantages of this invention will be apparent from the more detailed description which follows taken in conjunction with the accompanying drawings.

DESCRIPTION OF THE PREFERRED EMBODIMENTS

The FIGURE shows a simple block diagram of the process of the present invention. The acidic waste stream is introduced through line 10 to the cation exchange bed 12. Here, the heavy metals from the stream are exchanged for the alkali or alkaline earth ions of the cation resin leaving a heavy free effluent. The product water free of heavy metals is removed by line 14 in a condition suitable for discharge into streams or further industrial non-potable uses. The spent resin from the bed 12 is passed by line 16 to the resin regeneration zone 18. The resin in the regeneration zone is treated with a solution of an alkali or alkaline earth chelate introduced by line 22. This solution exchanges alkali or alkaline earth ions for the heavy metal present in the resin prior to regeneration to form a heavy metal chelate solution which is removed via line 24 to the precipitation zone 26. The regenerated resin for zone 18 is returned to bed 12 by line 20. In the precipitation zone 26 the solution is continuously regenerated by addition of a group Ia or IIa metal hydroxide alone or in combination with carbon dioxide via line 28. The metal hydroxides formed within precipitation zone 26 are removed via line 30. The regenerated chelate solution thus obtained is continuously recycled by line 22 to resin regeneration zone 18. Metal ions in general have varying affinitives for particular cation exchange resins. It is possible therefore through proper resin selection and sequential displacement to favor the deposition of particular heavy metals and thus achieve selectivity in metallic ion removal. This is known in the art. In most acid waste streams a single metal predominates and hence this treatment is entirely adequate. Among the other cations found in most acid waste streams, calcium is the most common, and this is non-toxic to most mammals and therefore does not provide an environment hazard. The product water from the treatment also contains alkali and alkaline earth salts generated during the instant process. As these are non-toxic the effluent from the process does not provide an environment hazard. It may be desirable to further demineralize the effluent to complete deionization, is such is desired. Such further treatment is disclosed in U.S. Pat. No. 3,700,592 issued Oct. 24, 1972 to D. O. DePree.

The present invention is applicable to both strongly and weakly acidic ion exchange resins, i.e., those within the range of complete dissociation to pH of 7.0 but is particularly applicable to the polymethacrylic cation exchange resin such as those sold under the name Amberlite CG-50 by Rohm and Haas, and others such as polyacrylic, polysalicylic acidformaldehyde polymers, phosphonic acid substituted polystyrenes, etc. Although any chelating agent which forms soluble metal chelates can be used, the preferred agents are the B-diketones (-dionates) e.g., acelylacetone, 1-phenylbutane-1, 3-dione, dibenzoyl methane, 2-acetylcyclohexanone and alkyl, aryl or halogen derivatives thereof. The important consideration is that the alkali or alkaline earth metal chelate and the heavy metal chelate formed be soluble in the organic solvent utilized in the It is obvious what modifications and improvements in this solubility can be achieved by modifying the β-diketone structure. The preferred solvent for the chelating agents is methanol. Other solvents which may be employed include alcohols other than methanol, e.g., ethanol, isopropanol, butanol glycols such as ethylene glycol, propylene glycol, aliphatic and aromatic ethers and polyethers, e.g., the dimethyl ethers of ethylene glycol, propylene glycol and other utilizable glycols, tetrahydrofuran and other cyclic ethers, such as dioxane.

Hydrocarbon solvents are not generally utilized alone because of solubility considerations. Other useful solvents include DMF, DMSO, and other oxygenated solvents. Mixtures of any of the above can also be used. The chelates are usually present in an amount sufficient to form a 0.1N to 5.0N solution. The upper limit of the chelate is determined by the solubility of the metal chelate and alkali or alkaline earth chelate in the particular solvent employed. Ferric acetylacetonte, for example, is extremely soluble in methanol forming clear solution concentrations of 3 and 4 normality. The utilizeable solvents as hereby classified as regenerating solvents.

Because of the acidic nature of the water soluble salts of the heavy metals and the release of hydrogen ion during exchange cationic resins in their hydrogen form are relatively ineffective in removing these metal ions from solution. Exchange is accomplished only by partial neutralization of the stream prior to treatment. This becomes difficult when a variety of ions are present which have tendencies to form insoluble hydroxides or basic salts at different hydrogen ion concentrations. For example, iron chloride which is highly acidic in water solution due to hydrolysis may be partially neutralized to a pH of 3.0 without precipitation and this adjustment permits loading this metal ion on a polymethacrylic resin in the resin hydrogen form. Titanium tetrachloride on the other hand though also forming highly acidic water solutions due to hydrolysis is converted even at these low pH levels to the basic salt and finally the dioxide of titanium.

The need for preliminary adjustment of the acidity of the solution is eliminated in the disclosed process by the use of the cation resin in its alkali and alkaline earth form. Thus hydrogen ions since they are not present, are not liberated and the effluent is neutralized by the elution of group Ia or IIa ions. Thus in this process heavy metal ions displace the groups Ia or IIa cations on the resin to give a neutral effluent as indicated in the following equations where M represents a heavy metal ion, X the anion of a strong acid, RCOO the cation resin and A an alkali or alkaline earth cation, and OH is hydroxyl ion.

RCOOA + MX → RCOOM + AX

The unique aspect of the process of this invention is that even though heavy metal salts in aqueous solution preferentially displace alkali or alkaline earth ions from cation resins, alkali and alkaline earth ions preferentially displace the heavy metal ion when the resin is treated with an alkali or alkaline earth chelate in organic solution. The following equation in which X represents a ligand (organic moiety of the chelate) illustrates this reaction.

RCOOM + XA → RCOOA + XM

The process encompasses first loading the disclosed resin efficiently with heavy metal ions from water solution, thereby providing a neutral effluent, regenerating the resin by treatment with an organic solution of an alkali or alkaline earth chelate, converting the resin to its original salt form ready for reuse. The recovered heavy metals are then precipitated from their chelate solutions by treatment of the regenerate eluate with an alkali or alkaline earth hydroxide, carbonate or basic salt, organic or inorganic, such that the alkali or alkaline earch chelate is recovered for recycle.

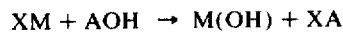
XM + AOH → M(OH) + XA

A neutral effluent from this demineralization process is an inherent characteristic of the process. Because the cation resin is utilized in the alkali or alkaline earth substituted form, the acidity of the feed stream is neutralized by the alkali or alkaline earth ions present on the resin. This acidity of the feedstream results from the hydrolysis of the water soluble metal salts of the Group Ib, IIb, IIIb, IVb, Vb, VIb, VIIb, and VIIIb metals which are present in the original feed stream. For example, a highly acidic feed stream which contains among its salts, $FeSO_4$, derives its acidity from the hydrolysis of $FeSO_4$ to produce a pH of 2 to 2.5. When hydrolyzed such a salt produces a weak base and a strong acid. In the instant process, the displacement of the alkali or alkaline earth metal ion on the resin by any of the claimed enumerated metal ions produces a salt reaction product which if hydrolyzed gives rise to both a strong acid and a strong base, i.e., a neutral salt, e.g., $FeSO_4$ + Na Resin yields Fe Resin + $Na_2SO_4$ and $Na_2SO_4$ is the salt of a strong acid and a strong base and is neutral in solution.

Typical bases which are employable include sodium methoxide, potassium isopropoxide, calcium bicarbonate and the lithium salt of benzyl alcohol.

The following examples are presented solely to illustrate the invention and should not be regarded as limiting in any way. In the examples the parts and percentages are by weight unless otherwise indicated.

The limitations imposed by both low pH and the liberation of hydrogen ion on the yield of deposited heavy metal ions on ion exchange resins in their hydrogen form is illustrated by the following examples of the effect of pH on the deposition of iron on a polymethacrylic acid resin.

EXAMPLE I

DEPOSITION OF HEAVY METALS ON POLYMETHACRYLIC ACID RESINS IN HYDROGEN FORM

Both an acqueous solution of ferric sulfate (237 ppm) having a pH of 3.0 and a solution of ferric sulfate at a pH of 1.5 were passed sequentially through Amberlite CG-50 resin and 20 ml. fractions of eluate collected. At a pH of 1.5 no iron was deposited on the resin. At a pH of 3.0 the first two fractions were free of iron while fractions 3 and 4 showed a trace of iron to be breaking through as indicated by treatment with KCNS solution. This breakthrough occurred at about 10% of the theoretical loading capacity of the column and represents the loading which would be anticipated when H+ ions are released by FE+++ displacement and can then act as a regenerant limiting loading of Fe+++. A typical acid waste stream component ferric sulfate has a pH due to hydrolysis of 2.3.

The loading of polymethacrylic resins (weakly acidic) achieved through the displacement of a sodium

EXAMPLE II

DEPOSITION OF HEAVY METAL IONS ON POLYMETHACRYLIC ACID RESINS (SODIUM LOADED)

A series of 0.25 to 0.33 diameter ion exchange columns were filled with Amberlite* CG-50 resin (a polymethacrylic acid resin), 100–200 mesh particle size. Individual aqueous solutions of a variety of heavy metal salts (500 ppm concentration in metallic ion) were prepared. Each of these solutions was passed through a resin column and the eluate collected in 25 ml. fractions and analyzed for the particular metallic ion by emission spectroscopy. The metal salts selected, the Group in the Periodic Chart of the Elements represented by the metallic ion, the nature of the resin selected, the volume of solution processed prior to breakthrough, and loading achieved, is presented in the following table.

* A trademark of Rohm and Haas.

| Heavy Metal Salt | Group No. | Volume Resin | Vol. Processed at Breakthrough | Resin Loading, % of Theory |
|---|---|---|---|---|
| Copper Sulfate | Ib | 10 ml. | 1200 | 30 |
| Zinc Sulfate | IIb | 5 ml. | 1150 | 58 |
| Aluminum Sulfate | IIIb | 5 ml. | 150 | 10 |
| Stannous Chloride | IVb | 10 ml. | 25 | 10 |
| Vanadyl Sulfate | Va | 5 ml. | 500** | 25 |
| Chromium Nitrate | VIa | 10 ml. | 600 | 15 |
| Manganous Sulfate | VIIa | 5 ml. | 500 | 25 |
| Ferric Sulfate | VIII | 10 ml. | >250 | >30 |

**Eluate contained 30 ppm V and increased after 500 ml. processed.
The eluate in all instances was neutral.

EXAMPLE III

REGENERATION OF HEAVY METAL LOADED RESINS WITH A METHANOLIC SOLUTION OF SODIUM ACETYLACETONATE

The loaded resins in the columns from Example II were each washed with 10 ml. of anhydrous methanol and then eluted with a α 1 N solution of sodium acetylacetonate in anhydrous methanol. The eluate was collected as a single sample and analyzed for heavy metal ion content by emission spectroscopy. The results obtained demonstrate the efficiency of the sodium acetylacetonate in removing the heavy metal ion by exchange.

| Heavy Metal Ion | Vol. Regenerant Used | Conc. Heavy Metal Ion in Eluate, ppm |
|---|---|---|
| $Cu^{++}$ | 50 | 1200 |
| $Zn^{++}$ | 25 | 70 |
| $Al^{+++}$ | 25 | 4000 |
| $Sn^{++}$ | 50 | 1750 |
| $V^{++++}$ | 25 | 1250 |
| $Cr^{+++}$ | 50 | 40 |
| $Mn^{++}$ | 25 | 870 |
| $Fe^{+++}$ | 100 | 2400 |

The following example demonstrates that alkaline earth loaded weakly acidic resins can also be used to remove heavy metal ions from aqueous solution.

EXAMPLE IV

DEPOSITION OF CUPRIC ION ON POLYMETHACRYLIC RESIN (CALCIUM LOADED)

Approximately 5 ml. (water swollen volume) of calcium loaded Amberlite CG-50 resin (a polymethacrylic acid resin) was prepared by treating 2 g dry weight of resin (H+ form) with 0.8 g of calcium hydroxide dissolved in 100 ml. of deionized water in a 0.33 in. diameter chromatographic column. The column was washed with dionized water to remove excess calcium hydroxide.

Copper sulfate solution (1,910 ppm in $Cu^{++}$), prepared by dissolving 2.4 g of $CuSO_4$ in 500 ml. of deionized water, was passed through the column and 50 ml. fractions of eluate collected. Analysis of these fractions by emission spectroscopy gave the following results.

| Fraction No. | Conc. $Cu^{++}$, ppm |
|---|---|
| 1 | 0 |
| 3 | 0 |
| 5 | 0 |
| 6 | 60 |
| 7 | 1060 |

The following example demonstrates that alkaline earth chelates in methanol solution readily regenerate heavy metal loaded weakly acidic resins.

EXAMPLE V

REGENERATION OF CU++ LOADED POLYMETHACRYLIC RESINS WITH CALCIUM 1,1,1-TRIFLUORO-5,5-DIMETHYL-2,4-HEXANDIONE

After washing with anhydrous methanol the loaded resin from Example IV was eluted with 100 ml. of 0.3 N calcium 1,1,1-trifluoro-5,5-dimethyl-2,4-hexandione* prepared by dissolving 5.88 g of the dione and 1.11 g of calcium hydroxide in methanol and diluting to 100 ml.

* Source - Eastman organic chemical

Ten ml. fractions of eluate were collected and analyzed by absorbence at 664 mu. The concentration of $Cu^{++}$ in the eluate fractions were as follows:

| Fraction No. | Conc. Cu++, ppm |
|---|---|
| 1 | 590 |
| 2 | 5840 |
| 3 | 2720 |
| 4 | 1480 |
| 5 | 630 |

The following example demonstrates the applicability of the process to moderately acidic resin systems.

EXAMPLE VI

DEPOSITION OF FERRIC ION ON POLYPHOSPHONIC ACID RESIN (SODIUM LOADED) BY ION EXCHANGE

A total of 4.3 ml. of Bio Rex 63, a moderately acidic, phosphonic acid substituted resin supplied by Bio-Rad Laboratories, in its sodium salt form was charged into a 0.25 in. diameter chromatographic column. A water solution of ferric nitrate containing 3,000 ppm of $Fe^{+++}$ was prepared and passed through the column and 50 ml. fractions of eluate collected and analyzed for ferric ion by light absorption at 440 um.

| Fraction No. | Conc. Fe+++, ppm |
|---|---|
| 1 | 1 |
| 2 | 1 |
| 3 | 360 |
| 4 | 550 |

The following example demonstrates that heavy metal ions are readily removed from moderately acidic ion exchange resins with alkali metal chelate solutions.

EXAMPLE VII

REGENERATION OF Fe+++ LOADED POLYPHOSPHONIC ACID RESIN WITH SODIUM ACETYL ACETONATE

After washing with anhydrous methanol the loaded resin from Example VI was eluated with a 1 N solution of sodium acetylacetonate in methanol (total of 25 ml) and 5 ml. fractions of eluate collected and analyzed by the same procedure described in Example VI. The analytical data obtained were as follows:

| Fraction No. | Conc. Fe+++, ppm |
|---|---|
| 1 | 7000 |
| 2 | 5900 |
| 3 | 1250 |
| 4 | 400 |
| 5 | 250 |

The following example shows that even strongly acidic resins may be used in this process.

EXAMPLE VIII

DEPOSITION OF MANGANOUS ION ON POLYSULFONIC ACID RESIN (SODIUM LOADED) BY ION EXCHANGE

A volume of 9.5 ml. of sodium loaded AG-50W-X8 resin, a strongly acidic, styrene based, polysulfonic acid resin manufactured by Dow Chemical Company was charged into a 0.33 in. diameter chromatographic column. An aqueous solution of manganous sulfate having a concentration of 6,500 ppm ion was passed through the column and 50 ml. fractions of eluate collected and analyzed for manganese ion by emission spectroscopy. The results of these analyses were as follows:

| Fraction No. | Conc. Mn++, ppm |
|---|---|
| 1 | 1 |
| 2 | 20 |
| 3 | 600 |
| 4 | 4800 |

The following example illustrates the removal of heavy metals from strongly acidic resins with an alkali metal chelate solution.

EXAMPLE IX

REGENERATION OF Mn++ LOADED POLYSULFONIC ACID RESIN WITH SOIDUM ACETYL ACETONATE

After washing with anhydrous methanol the resin from Example VIII was eluted with 100 ml. of a 0.25 N solution of sodium acetate in methanol containing 1% by volume of deionized water. Twenty-five ml. fractions of eluate were collected and analyzed for Mn++ concentration by UV absorbance. The analytical results were as follows:

| Fraction No. | Conc. Mn++ |
|---|---|
| 1 | 300 |
| 2 | 320 |
| 3 | 500 |
| 4 | 980 |

The following examples X and XI illustrate the fact that mixtures of heavy metals may be deposited on the resin and removed by subsequent regeneration.

EXAMPLE X

DEPOSITION OF A MIXTURE OF HEAVY METAL IONS ON POLYMETHACRYLIC ACID RESIN (SODIUM FORM) BY ION EXCHANGE

A 10 ml. volume of sodium loaded Amberlite* CG-50 resin, a weakly acidic, polymethacrylic acid resin manufactured by Rohm and Haas Co., was charged to a 0.4 in diameter chromatographic column.

* A trademark of Rohm and Haas.

An aqueous solution containing ferric sulfate, cobalt sulfate and copper sulfate in which each of the cations were present at a predetermined concentration of 200 ppm was passed through the column and 50 ml. fractions of eluate collected. A total of 700 ml. of eluate was collected before any breakthrough of heavy metal ion into the eluate occured. The first ion to break through was cobalt as indicated by a pink color in the eluate and analysis of the eluate after breakthrough by emission spectroscopy which gave the following results:

| Concentration, ppm | | |
|---|---|---|
| Fe+++ | Cu++ | Co++ |
| <1 | <1 | 200 |

The ions were found to be deposited sequentially on the resin. The upper portion of the column was tan in color indicating it to contain predominantly ferric ion, the middle portion was composed of a green upper layer turning to blue in the lower portion indicating a preponderance of cupric ion, and the lowest portion of the column was pink indicating a preponderance of cobaltic ion.

EXAMPLE XI

REGENERATION OF Fe+++, Co++ and Cu++ LOADED POLYMETHACRYLIC ACID RESIN WITH SODIUM ACETYL ACETONATE The loaded resin from Example X was washed with 50 ml. of anhydrous methanol. The resin was then eluted with 50 ml. of a 1N. solution of sodium acetylacetonate in anhydrous methanol. A total of two 25 ml. fractions of eluate were collected. These fractions were analyzed by emission spectroscopy and the following results obtained.

| Fraction No. | Concentration, ppm | | |
|---|---|---|---|
| | Fe+++ | Co++ | Cu++ |
| 1 | 220 | 400 | 140 |
| 2 | 400 | 1000 | 7 |

The fractions are combined, and a slight excess of sodium hydroxide in methanol solution is added with stirring to the eluate with resultant precipitation of the heavy metal hydroxides.

The precipitate is now ready for selective separation as desired by utilizing the differences in the amphoteric properties of the various metals.

As shown previously, in Example IX, anhydrous organic solvents are not required. Up to about 10% of deionized water may be added to the utilized solvent, provided that the eluted heavy metal chelate is soluble in the mixed solvent system and further provided that the organic solvent is fully mixable with water. In some instances small additions of water to the elute is desirable to maintain the resin in its swollen form to ensure efficient diffusion of the regenerant solution into the resin.

The process of the instant invention can be carried out independent of temperature and pressure.

Since the process here is an ion displacement process, rather than a demineralization process, it is seen that the acid strength of the resin is not a critical parameter. Hence any cationic resin which forms metallic salts can be employed.

The concentrations of heavy metal ions present in the original aqueous solution to be environmentally purified has no bearing on the ability of the process to operate. Plant size considerations (bed size, column diameter, and the like) are the only practical limitations on the practice of this invention.

The process, as demonstrated in the preceding examples, has been shown in most instances, even at high concentration of heavy metal ion to give essentially complete environmental purification (heavy metal ion removal).

The concentration of the regenerant solution is limited only by the solubility of the Group Ia and/or Group IIa chelate employed.

It is also to be seen that a mixture of at least one Group Ia and at least one Group IIa metal chelates can be used in combination.

It is further to be seen that in some instances it may be desirable to employ mixtures of resins each of which has a different acid strength to achieve higher resin loadings.

It is obvious that while the disclosure has demonstrated the removal of certain heavy metal ions on particular resins, equally satisfactory results are obtainable when other metal ions of the set forth groups are treated with other cationic resins in the alkalie earth or alkali metal form.

A skilled chemist being cognizant of the oxidative capacity of certain heavy meatal ions may find it desirable to conduct the process in the absence of oxygen.

It is seen that the instant process is utilizeable only with those heavy metals which form cations in aqueous solution. Thus titanium tetrachloride, which is often present in industrial waste and which is not stable in aqueous media but forms the dioxide by hydrolysis, even at pH's as low as about 1, is therefore incapable of having the titanium ion removeable. The process is utilizeable for all heavy metals as prevously defined and in particular with respect to the transition metals.

Other heavy metal ions such as chromium can appear both as the cation, $Cr^{+++}$, in anionic form, the chromate $-CrO_4^=$ and thus only the former ionic form is removeable by the insant process.

Although the process would customarily be carried out by passing the aqueous solution of the heavy metals through a fixed ion exchange bed, other state of the art techniques such as back flow processes, countercurrent processes, or slurry techniques may be employed.

Although the process has primary application to streams that constitute an environmental hazard such as acid mine waste (iron, manganese, aluminum and perhaps copper from coal and other mineral mining processes), electroplating wastes (chromium, tin, copper, zinc and nickel plating techniques) and pickling wastes (iron and vanadium passivation and surface cleaning operations, the instant process is applicable to metal winning from natural streams such as sea water, certain mountain runoff streams and may even find application in a metal refining process where an acid leach is initially employed to extract metals from raw ores. This application is described in the following example.

EXAMPLE XII

EXTRACTION AND RECOVERY OF HEAVY METAL IONS FROM ORE

Four grams of Bornite, which contains the metals copper and iron and has the chemical structure of $Cu_5FeS_4$ was heated in a concentrated solution of HCl 4 for 24 hours to leach out at least part of the heavy metal in content. The green colored solution was filtered to remove suspended materials diluted to 1,000 ml. and analyzed by emission spectroscopy for metal ion content which was determined to be as follows:

Concentration of Heavy Metals, ppm

| Cu++ | Fe+++ |
|---|---|
| 160 | 30 |

Back weighing the suspended materials removed by the above filtration yielded 3.4 grams of materials other than Cu, Fe and S.

These metal sulfates are now in a form suitable for removal by the instant process. Removal of these ions by the instant process was accomplished by passing the green colored sulfate solution after adjusting the pH to 2.5 to neutralize excess HCl through a 0.4 in. diameter column which contained 10 mil. of Amberlite* CG50 resin (polymethacylic acid in its sodium substituted form), while still warm (about 35°C). Several 25 ml. fractions were collected of the eluate, and analyzed for heavy metal ion content. The results are as follows:

| Fraction No. | Concentration of Heavy Metal, ppm | |
|---|---|---|
| | $Cu^{++}$ | $Fe^{+++}$ |
| 1 | 850 | 325 |
| 2 | 340 | 15 |

EXAMPLE XIII

EXTRACTION OF HEAVY METAL FROM ORE AND DEPOSITION ON CATION EXCHANGE RESIN

Six and one-half grams of Rhodocrosite, an ore which contains the metal manganese in the chemical form of manganese carbonate, was leached with 10 ml. of concentrated hydrochloric acid over a 16 hr. period. Essentially all of the ore disolved with the evolution of carbon dioxide. The light pink solution (manganous chloride) was filtered to remove a trace of suspended material and diluted to 1,000 ml. with dionized water. The pH of the diluted solution was found to be approximately 5 indicating that no excess mineral acid remained. The manganese content of the diluted solution was determined to be approximately 3,000 ppm.

The above solution was then contacted with 10 ml. of Amberlite* CG-50 resin (a weakly acidic, polymethacrylic resin in its sodium form) using a 0.5 in. diameter chromatographic column. The resin developed a yellow tan color on deposition of manganese. A total of 290 ml. of eluate from the column was collected before breakthrough of manganese occured.

These examples show that heavy metals can be removed from their ores and their ions separated by adaption of the instant process. The ore processing product water discharged and/or collected is free of heavy metal cationic pollutants. This water can either be discharged directly into the environment or after further treatment to remove Group Ia and Group IIa salts at the option of the processor as may be required by appropriate regulation. This ore processing product water, after the Group Ia and IIa salt concentration is lowered to acceptable levels, depending upon intended application, may be utilized for agriculture, potable water and industrial purposes.

As previously mentioned, any chelating agent known to the art which provides an organic solvent system soluble alkali (La, K, Li, Cs, Rb) Group Ia or alkaline earth (Ca, Mg, Ba, Be, Sr) Group IIa chelate is employable herein provided that the heavy metal ion(s) to be removed also is/are soluble in the same solvent system. Thus other chelates besides the preferred B-dionates, such as aryl or alkyl substituted phosphates, e.g., phenyl phosphate, and di-n-octyl phosphate, alkyl or aryl substituted phosphites, e.g., di-2-ethylhexyl phosphite and diphenyl phosphite, esters of B-dicarcoxylates, e.g., diethyl malonate.

It is to be understood that either or both of the steps of initially contacting the resin with the solution of heavy metal ions, and also the regeneration step can be carried out using fixed resin beds, fluidized concurrent beds, and fluidized counter-current beds and any combination thereof with equally satisfactory results. The mode of carrying out each of the two steps is dependent upon economic, and engineering considerations taking into account the metals to be removed.

While I have demonstrated by examples the deposition of specific metals on certain resins, similar results are obtainable for all of the water soluble heavy metal cations when deposited on any of the resin types disclosed, i.e., weakly acidic, moderately acidic or strongly acidic resins.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What I claim is:

1. A method for the removal of water soluble Group Ib, IIb, Vb, VIb, VIIb, and VIIIb metallic ions from highly acidic water solutions containing said ions which comprises initially contacting the solution with a cation exchange resin, which resin is present as the alkali or alkaline earth form thereof, depositing the water soluble metallic ions on said resin, providing a neutral effluent, and regenerating the cation exchange resin by contacting same with a regenerating solvent solution of an alkali or alkaline earth chelate.

2. The process of claim 1 including the additional step of precipitating said metallic ions from the regenerating solvent solution by the addition of an alkali or alkaline earth base.

3. The process of claim 2 wherein at least two metallic ions are removed by contact with the cation exchange resin.

4. The process of claim 3 wherein the chelate employed is a B-dionate.

5. The process of claim 4 wherein the solvent employed is a compound having at least one hydroxyl group.

6. The process of claim 2 wherein the initial contact and the regeneration steps are carried out in one of the following types of cation exchange beds, fixed, fluidized concurrent, and fluidized countercurrent, a different bed mode being utilized for each step.

7. The method of claim 1 wherein the regeneration step is carried out in an alcoholic solution of the chelate.

8. The method of claim 7 wherein the alcoholic solution contains methanol.

9. The method of claim 1 wherein the chelate is a betadionate.

10. The method of claim 9 wherein the betadionate is selected from the group consisting of acetylacetone and 2-acetylcyclohexanone.

11. The process of claim 1 wherein the chelate is selected from the group consisting of organic phosphates, organic phosphites and esters of B-dicarboxylates.

12. The process of claim 1 wherein the contacting consists of passing the solution of the metallic ions through a cation exchange bed which is a fixed bed.

13. The process of claim 12 wherein the cation exchange bed is a fluidized bed.

14. The process of claim 13 wherein the contacting and regeneration steps are carried out in a countercurrent fashion.

15. The process of claim 1 wherein both the initial contacting and the regeneration steps are carried out in a fixed bed.

16. The process of claim 1 wherein both the initial contacting and the regeneration steps are carried out in a fluidized bed.

17. The process of claim 16 wherein the contacting and regeneration steps are carried out in a countercurrent fashion.

18. The process of claim 1 wherein at least two metallic ions are removed by contact with the cation exchange resin.

19. A process for the removal of transition metal ions from highly acidic water solutions containing said ions which comprises contacting the solution with a polymethacrylic acid type ion exchange resin in its alkali metal or alkaline earth metal substituted form, depositing the transition metals thereupon and simultaneously providing a neutral effluent from the exchange including the additional step of regenerating the cation exchange resin in a regeneration solvent solution with a chelate.

20. The process of claim 19 which comprises the additional steps of precipitating said transition metal ions by the addition of an alkali or alkaline earth base to the solvent solution from the regeneration step.

21. The process of claim 20 which comprises carrying out the regeneration step with alcoholic solution of a chelate selected from the group consisting of alkali and alkaline earth betadionates.

* * * * *